United States Patent [19]

Montgomery

[11] Patent Number: 4,644,472
[45] Date of Patent: Feb. 17, 1987

[54] FLOW CONTROL BETWEEN A DATA TERMINAL AND A HOST COMPUTER SYSTEM

[75] Inventor: Warren A. Montgomery, DeKalb, Ill.

[73] Assignee: AT&T Bell Laboratories, Murray Hill, N.J.

[21] Appl. No.: 672,819

[22] Filed: Nov. 19, 1984

[51] Int. Cl.⁴ .............................................. G06F 1/00
[52] U.S. Cl. ..................................... 364/300; 364/200
[58] Field of Search ... 364/200 MS File, 900 MS File, 364/300

[56] References Cited

U.S. PATENT DOCUMENTS

| | | | |
|---|---|---|---|
| 4,082,922 | 4/1978 | Chu | 179/15 |
| 4,150,438 | 4/1979 | Dorey et al. | 364/900 |
| 4,415,986 | 11/1983 | Chadra | 364/200 |

*Primary Examiner*—Raulfe B. Zache
*Attorney, Agent, or Firm*—John C. Moran

[57] ABSTRACT

A host computer system allowing the utilization of designated characters as flow control characters and also the utilization of the same designated characters as ordinary data. During the transfer of data from the host computer to the terminal, the operating system controlling the host computer first disables the use of the designated characters as flow control characters, starts the transfer of information to the terminal, performs operations to determine whether or not the terminal is approaching the point where it can no longer receive data, and enables the utilization of the designated characters as flow control characters when the terminal reaches the latter point. The enabling of the designated characters for use as flow control characters allows the terminal to signal to the computer when it has received too much data and control the flow of data to the terminal using the designated flow control characters. When the operating system is preparing to receive large amounts of data from the terminal, it disables the flow control utilization of the designated characters so that these characters can be transmitted from the terminal to the computer as data. The operating system is of the multi-program type and the enabling and disabling of the flow control is accomplished by an application program making requests to an I/O handler program that is directly controlling the terminal via operating system calls.

10 Claims, 3 Drawing Figures

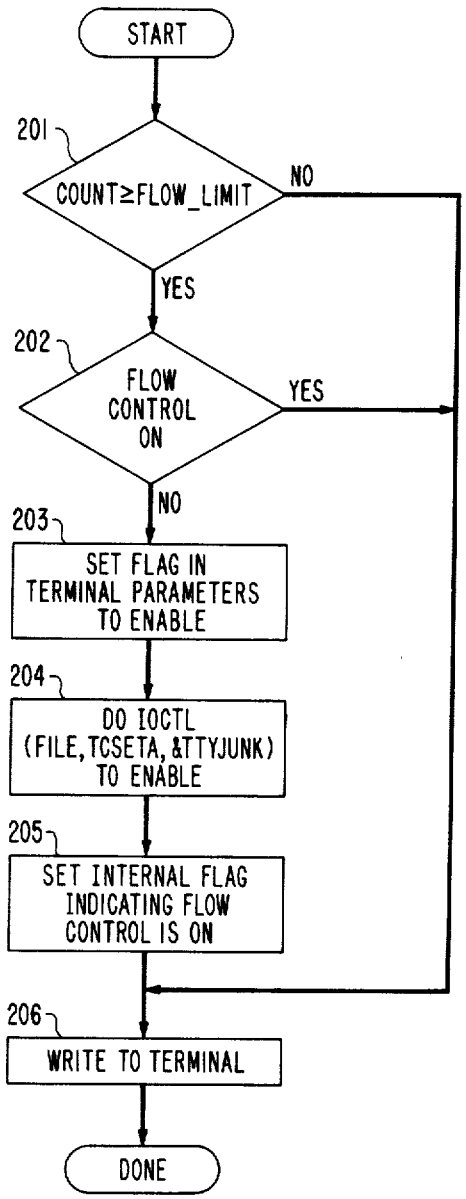

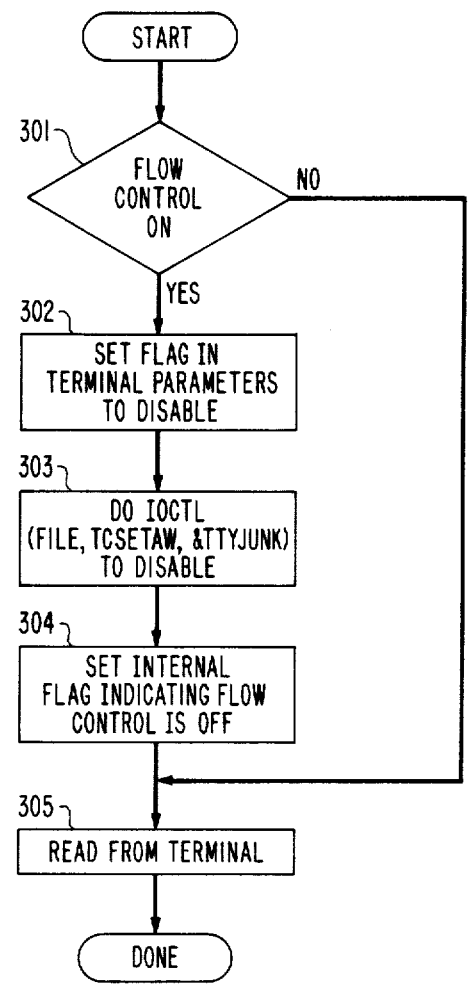

FLOW CONTROL BETWEEN A DATA TERMINAL AND A HOST COMPUTER SYSTEM

TECHNICAL FIELD

This invention relates to a method for controlling the interexchange of information between a data terminal and a host computer. The invention particularly relates to the host computer determining when the terminal is receiving or transmitting information and controlling the flow control strategy on the basis of this determination.

BACKGROUND OF THE INVENTION

Flow control between computer system hosts and data terminals is needed in many cases to prevent a high-speed host from transmitting more information in a given period than a terminal can display or buffer. At present, most terminals incorporate microprocessors for controlling the reception and transmission of data between the terminal and the host computer system. The microprocessor utilizes an internal buffer to store the data being received from the host computer until this data can be printed or displayed.

Within the art, it is known to use flow control schemes whereby the microprocessor when it senses that its internal buffer is near overflowing transmits a flow control character to the host computer. The host computer is responsive to the flow control character to cease transmission of data to the terminal. When the terminal is capable of receiving more information, the microprocessor transmits another flow control character to the host computer system causing the latter to recommence transmission of data. One such scheme uses the control-S character to suspend transmission and the control-Q character to restart the transmission.

Also in the art, it is known to utilize control signals that are transmitted on separated conductors from those used to communicate the data to allow the terminal to start and stop communication with a host computer. While this scheme is simple and effective, it is rarely used, largely because the host computers normally do not have the hardware necessary to read the state of these control leads and also because the attachment of these leads require that the computer terminals be directly connected to the host computer system. Normally, the terminals are not directly connected to the host computer system but communicate with the host computer system via a telephone switching system or a similar voice band switching system.

Whereas the utilization of special flow characters for stopping and starting the transmission of data from the host computer to the terminal presents a solution to the problem of the terminal receiving too much data, another problem exists in that the flow control characters then cannot be used by application programs for other functions. One such type of application program is the so called visual editor program which allows the operator of a terminal to input and edit information in an extremely efficient manner. The reason for this efficiency is that the operator of the terminal has a direct visual picture of the information that is presently in the host computer system. Because of the large number of operations which such an application program can perform, there exists a problem in that there are not a sufficient number of unique keys for controlling these different operations and yet allow the normal inputing of data to the host computer system. Another application program that needs to be able to receive these special characters is one which is reading data files from sophisticated terminals doing stand-alone processing operations. Such terminals often only use the host system for data storage.

The problem is further complicated by the fact that the application program does not directly transmit or receive information from the terminal but rather uses the facilities of an operating system controlling the host computer. Such an operating system is described in D. M. Ritchie and K. Thompson, "The UNIX Time-Sharing System," *Bell System Technical J.*, Vol. 57, No. 6, Part 2, July, 1978, pp. 1905–1940. In particular, an I/O handler routine in the operating system is used to communicate information between a terminal and the application program.

From the foregoing, it can be seen that there exists a need for a method that allows the utilization of special flow control characters for the purpose of stopping and starting the transmission of data from a host computer to a terminal and yet allows the special characters to be directly communicated to an application program running on the host computer under control of an operating system.

SUMMARY OF THE INVENTION

In an illustrative method, a departure in the art is achieved by controlling the utilization of flow control characters by determining when a data terminal interconnected to a host computer system is approaching the threshold point of data overflow and enabling the flow control facilities when this point occurs. In addition, the flow control facilities are disabled when data is about to be received from the terminal by the host computer system.

The illustrative method for transferring data from the computer system to a terminal involves the steps of disabling the use of designated characters for flow control, transferring data from the computer system to the terminal, determining when the terminal is approaching the point of no longer being able to receive data, and enabling the use of the designated characters for flow control upon their receipt by the computer system from the data terminal. This enabling allows the data terminal to control the flow of information from the computer system to a rate at which the terminal can properly display or buffer this information.

The illustrative method further includes the step of inhibiting the use of the designated characters for flow control when the computer system is receiving information from the terminal. Also, this inhibiting step involves the storing of a flag which when set, indicates that flow control is enabled. The inhibiting step involves checking the flag; and if the flag is set, changing the flag to the reset state and ceasing to utilize the designated characters as flow control characters.

Advantageously, the step of determining when the terminal can no longer receive information involves the steps of calculating the amount of information to be transferred from the computer to the terminal and comparing the calculated amount of data with a predetermined amount that indicates how much data the terminal can receive.

In particular, the method involves the utilization of a designated set of characters for both flow control and data during the communication of characters between a computer system and a terminal. The computer system is operating under control of a multiprogramming operating system and is executing both an application program and an I/O handler program. The I/O handler program directly controls communications with the terminal. The transfer of data from the application program to the terminal via the I/O handler program involves the steps of requesting the transfer of characters by the application program executing a write system call to the operating system, determining whether the terminal is capable of receiving of all of the requested characters by the write system call, and enabling flow control in the I/O handler program upon the write system call verifying that the terminal is approaching a threshold point of being incapable of handling all of the request characters.

Also, the determining step involves the write system call verifying the number of characters to be transferred is greater than a predetermined number and executing still another system call to enable the use of the designated characters as flow control characters by the I/O handler program. In addition, the write system call maintains an internal flag which indicates whether flow control is enabled or not. Before executing the other system call, the write system call determines that the internal flag indicates that the flow control is not enabled.

BRIEF DESCRIPTION OF THE DRAWING

FIG. 2 is a flow chart of an illustrative system call in occurrence with this invention to transfer information to an I/O device from an application program; and FIG. 3 is a flow chart of an illustrative system call in occurrence with this invention to transfer information to an application program from an I/O device.

DETAILED DESCRIPTION

Figure 1:
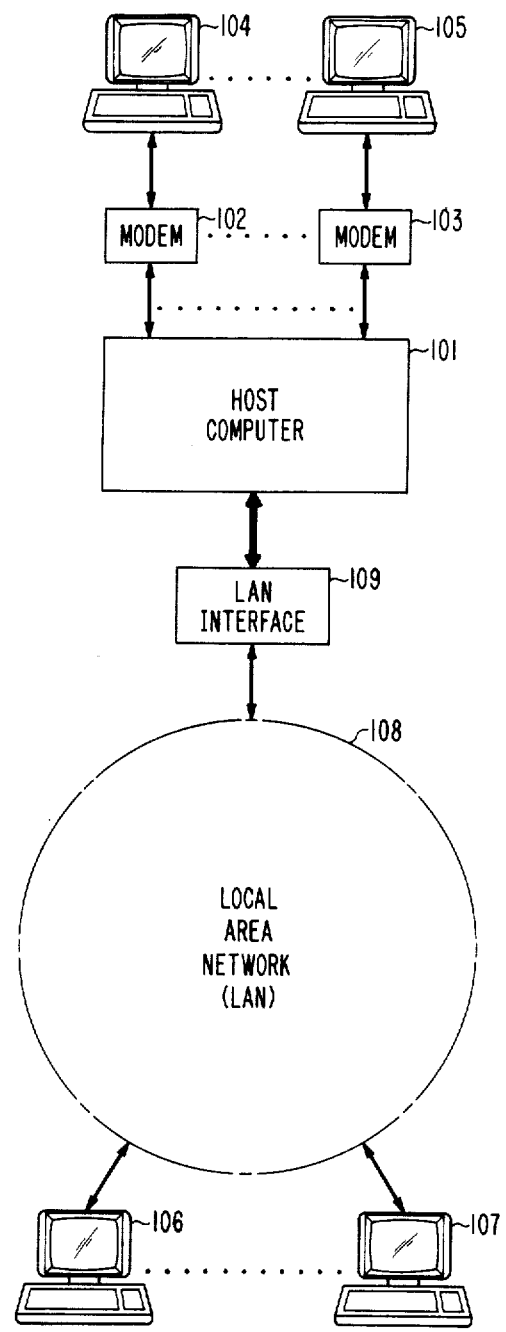
FIG. 1 is a block diagram of an illustrative data processing system.

FIG. 1 illustrates a plurality of terminals 104 through 107 interfaced to host computer 101. The terminals 104 through 105 are interfaced to computer 101 via modulator demodulator (modem) units 102 through 103; and terminals 106 through 107 are interfaced to computer 101 via local area network (LAN) 108 and LAN interface 109. Terminals 106 through 107 cannot only communicate with computer 101 via LAN 108, but also among themselves. This intercommunication between terminals 106 through 107 via LAN 108 increases the probability that data being transferred from computer 101 to LAN 108 via LAN interface 109 may have to be done at a reduced rate at times due to the inability of LAN interface 109 to gain access to LAN 108. Terminals 104 through 107 may be of the conventional data terminal type such as Model HP 2621B manufactured by the Hewlett-Packard Corporation, Palo Alto, Calif., or they can also be of the personal computer type such as the AT&T 630 Personal Computer marketed by the American Telegraph and Telephone Corporation, New York, N.Y.

If the terminals are of the personal computer type, the personal computers may be executing programs that allow them to emulate a conventional data terminal, or they may be operating in a stand-alone basis and utilizing computer 101 for the bulk storage of data and programs. If computer 101 is being utilized for the bulk storage of programs and data, there is a high likelihood that large amounts of information must be transferred from computer 101 to the personal computer and vice versa. In the case of object programs, that comprise binary type information, it is highly likely that the codes for conventional flow control are present in the object programs being transferred to computer 101 from the personal computer.

Illustratively, computer 101 is operating under control of the UNIX operating system which is described in the previously referenced article by Ritchie and Thompson. A more detailed explanation of the UNIX operating system is given in the book entitled, *UNIX Time-Sharing System: UNIX Programmer's Manual*, Hote, Rinehart, and Winston, 1983. The UNIX operating system is a general purpose, multiprogramming, interactive operating system that has been implemented on a wide variety of microcomputers, minicomputers, and computers.

An important concept in a multiprogramming operating system such as the UNIX operating system is the concept of a process. Within computer 101 there can be a number of independent programs being executed at any given point in time. Each of these programs is executed by computer 101 as one or more processes each defining a set of states of the program. Only one process is active on computer 101 at any given point in time. Each process is given a fixed amount of active time or until it makes a request (system call) to the operating system. When one of the latter two conditions occurs, the process is put into a state of suspension, and another process is given control of the system. An application program running on computer 101 has at least one process associated with it and may have more than one. If the application program attempts to read or write terminal 104, for example, it does so by making a request to the operating system which results in an idle handler program being initiated as an I/O process. The application program process and the I/O handler process then communicate back and forth between each other utilizing system calls. A further discussion of process creation and process control is given in the article by K. Thompson, "UNIX Time-Sharing System: UNIX Implementation," *Bell System Technical* J., Vol. 57, No. 6, Part 2, July, 1978, pp. 1931-1946.

The manner in which I/O operations are performed by the UNIX operating system is further described in the previously referenced article of K. Thompson. The portion of the UNIX operating system devoted to I/O operations is commonly called the I/O subsystem. Within the UNIX operating system, the I/O subsystem is broken into two separate units, block I/O which comprises such things as magnetic disk drive handlers and character I/O which includes terminal handlers. The character I/O device handlers are implemented using common code to handle character lists. A character list is a queue of characters. One routine puts a character on a queue when the character is received from a terminal. Another routine gets a character from a queue when it is time to output a character to a terminal. It is also possible to ask how many characters are currently on a queue. Storage for all queues in the system come from a single common pool. When an application program has a character to be outputted to a terminal, it places the character on the queue by making a system call through the operating system that results in the character being placed on the queue. The I/O handler starts as soon as there is anything on the queue, and once started, it is sustained by hardware completion interrupts. An I/O device initiates the completion interrupt once it has received the character. Each time there is a completion interrupt, the driver gets the next character from the queue and sends it to the I/O device or terminal. The number of characters on the queue is checked and, as the count falls through some intermediate level, an event is signaled. The process that is passing characters from the application program to the queue can be waiting on the event, and refill a queue to its maximum when the event occurs. In addition, as the I/O handler is outputting the characters, it interprets the output stream of characters and performs some translations, e.g., escapes for terminals which do not have this type of operation. Another common type of interpretation is to insert real time delays after certain control characters in order to give a particular terminal time to finish an operation, e.g., such as a carriage return.

Input from terminals is slightly different. Characters are collected from the terminal by the I/O handler routine and placed on a raw input queue. Some device-dependent code conversion and escape interpretation is performed here. When a line is complete in the raw queue, an event is signaled. The code catching this signal then copies a line from the raw queue to a canonical queue performing the character erase and line kill editing. User read requests of terminals can be directed at either the raw or the canonical queues. In addition, the code within the I/O handler that is placing information on the raw input queue also can be enabled to interpret the control-S character to suspend transmission to the terminal and the control-Q character to restart the transmission. This enabling is performed by a system call to the I/O handler.

In order to understand how the system calls from an application program to the I/O handler are made via the UNIX operating system, it is desirable to have a general understanding of the manner in which the I/O operations are treated within the I/O subsystem. The operation of the I/O subsystem is treated in detail in the previously referenced article by Ritchie and Thompson. The following is intended to merely summarize the latter information. Within the UNIX operating system, each I/O device is treated as a special file in a manner similar to data files which are stored on magnetic disks. These special I/O files are read and written just like ordinary disk files, but requests to read or write result in activation of the associated I/O device. I/O devices are treated in this manner for three reasons: (1) file and device I/O operations are similar as possible; (2) file and device names have the same syntax and meaning, so that a program expecting a file name as a parameter can be passed a device name; and (3) special files are subject to the same protection mechanism as regular files. The system calls to do I/O operations are designed to eliminate differences between various devices and styles of access. The goal is to create a common way of reading and writing I/O devices.

An application program communicates with the I/O handler by executing write and read system calls. To read or write a data file or an I/O device (special file), the file must be opened by the following call:

FILEP=OPEN (NAME, FLAG)

where "NAME" indicates the name of the I/O device. The "FLAG" argument indicates whether the file is to be read, written, or read and written simultaneously. The returned value "FILEP" is called a file descriptor. It is a small integer number used to identify the I/O device in subsequent read and write system calls.

Once an I/O device is open, it may be read by using:

N=READ (FILEP, BUFFER, COUNT)

and written by

N=WRITE (FILEP, BUFFER, COUNT)

up to "COUNT" bytes are transmitted between the I/O device specified by "FILEP" and the byte arrays specified by "BUFFER". The return value "N" is the number of bytes actually transmitted. In the "WRITE" case, "N" is the same as "COUNT" except under exceptional conditions, such as I/O errors; in a "READ", however, "N" maybe without an error condition existing be less than "COUNT". For example, if the "READ" pointer is so near the end of the file that reading "COUNT" characters would cause reading beyond the end, only sufficient bytes are transmitted to reach the end of the file; also, typewriter-like terminals never return more than one line of input.

Within the UNIX operating system, there are a number of other system calls which are utilized in dealing with the I/O subsystem, and these system calls are given in the previously mentioned article by Ritchie and Thompson and in the UNIX Programmer's Manual. One special system call is the IOCTL system call which, among other things, may be utilized to enable and disable the recognition of the control-S and control-Q as flow control characters.

In order to maintain the goals of the UNIX operating system and provide the automatic enabling and disabling of the flow control characters, system calls, as illustrated in FIGS. 2 and 3, provide the automatic enabling and disabling of the recognition of the flow control characters; yet, maintain a simple and straightforward interface between the application program and the I/O handler. The source code for implementing the routines illustrated in FIGS. 2 and 3 is given in Appendix A. The source code in Appendix A is written in the C programming language. The latter is described in the book by B. W. Kernighan and D. M. Ritchie, *The C Programming Language*, Prentice-Hall, 1978. An application program written to take advantage of the automatic enabling and disabling of the flow control characters utilizes the READ_TERMINAL and WRITE_ TERMINAL system calls as illustrated in FIGS. 2 and 3 in place of the standard READ and WRITE system calls of the UNIX operating system, respectively.

FIG. 2 illustrates the WRITE_TERMINAL system call. When this call is executed by an application program, decision block 201 first checks to ascertain whether the number of characters, as defined by "COUNT", have exceeded the limit at which flow control is enabled. "COUNT" is specified by the application program. This limit of characters is defined by the variable "FLOW_LIMIT". This is illustratively shown in Appendix A as a predefined variable, but one skilled in the art could also control this variable through the system call itself or from feedback from a terminal or interface circuit. If the count exceeds the maximum number of characters to be transmitted, decision block 202 is executed to determine whether or not the flow control is presently enabled. If flow control is not enabled, then blocks 203 through 205 are executed resulting in the enabling of the flow control via an IOCTL system call and the setting of an internal flag for future use by WRITE_TERMINAL. This internal flag is utilized by decision block 202 to determine whether flow control is enabled or disabled. Finally, block 206 is executed resulting in the characters being transmitted to the terminal. Block 206 is implemented by making the UNIX operating system WRITE system call.

The READ_TERMINAL system call is illustrated in FIG. 3. When this system call is executed by the an application program, decision block 301 first determines whether flow control is enabled. If the flow control is enabled, blocks 302 through 304 are executed resulting in the flow control being disabled. The disabling is performed, once again, by utilizing the IOCTL system call, and an internal flag is reset for future utilization by decision block 301. The reading of the information from the I/O device is performed by block 305 executing the UNIX operating system READ system call.

It is to be understood that the above-described embodiment is merely illustrative of the principles of this invention; other arrangements may be devised by those skilled in the art without departing from the spirit and scope of this invention. Particularly, there exists operating systems other than the UNIX operating system that can utilize the invention. These operating systems include but are not limited to the XENIX operating system and the COHERENT operating system.

---

APPENDIX A

```
#include <termio.h>
/* Terminal input and output functions for allowing ^S and ^Q
 * to be read from the terminal, while using them for flow control
 * on output. The structure "ttyjunk" should be initialized to
 * whatever terminal modes are desired normally. It is used by
 * these functions to enable and disable flow control. The
 * parameter "flow_lim" should be set to the amount of output
 * the terminal can handle before flow control must be enabled.
 * Typically 64 characters can be used as a limit. */
/* The flag "xon" keeps track of whether flow control is on or
 * off and should be initialized to whatever state flow control is
 * initialized to on the terminal by the application program */
struct termio ttyjunk;
int flow_lim = 64;
int xon;
       /* The function "read_terminal" acts just like the read(1)
        * system call, but handles the flow control function. Likewise,
        * "write_terminal" acts like write(1) */
read_terminal(file,buffer,count)
int file;           /* file identifier for terminal */
char *buffer;       /* Character buffer for read */
int count;          /* Count to read */
{
    if (xon) {
            ttyjunk.c_iflag &= ~(IXON|IXANY);
            ioctl(file,TCSETAW, &ttyjunk);
            xon = 0;
    }
    return(read(file,buffer,count));
}
write_terminal(file,buffer,count)
int file;           /* file number for terminal */
char *buffer;       /* buffer to write out */
int count;          /* number of characters written */
{
    if (count > flow_lim) {
            if (xon == 0) {
                ttyjunk.c_iflag |= (IXON|IXANY);
                ioctl (file,TCSETA,&ttyjunk);
                xon = 1;
            }
    }
    write(file,buffer,count);
}
```

What is claimed is:

1. A method allowing the utilization of sets of information bits for both flow control and data during communication between a terminal and a computer system comprising the steps of:
   disabling the use of said sets of information bits for flow control;
   transferring information from said computer system to said terminal;
   determining that said terminal can no longer receive information; and
   enabling the use of said sets of information bits for flow control upon their receipt from said terminal.

2. The method of claim 1 further comprising the step of inhibiting said use of said sets of information bits for flow control upon said computer system transferring information from said terminal to said computer system.

3. The method of claim 2 wherein said computer system stores flag information to indicate whether said sets of information bits are to be utilized for flow control and said step of enabling comprises the step of setting said flag information to an enable state;
   said inhibiting step further comprises the step of interrogating said flag information; and
   disabling said use of said sets of information bits for flow control upon said flag information indicating said sets of information bits are enabled for flow control.

4. The method of claim 3 wherein said determining step further comprises the steps of:
   calculating the amount of information to be transferred from said computer to said terminal; and
   comparing the calculated amount with a predetermined amount to indicate whether said terminal can receive said amount of information.

5. A method of utilizing a set of characters for both flow control and data during the communication of characters between a computer system and a terminal, said computer system operating under control of a multiprogramming operating system and executing an application program and an I/O handler program, comprising the steps of:
   requesting the transfer of characters by said application program to said terminal from said computer system;
   determining whether said terminal is capable of receiving all of the requested characters by said operating system; and
   enabling flow control in said I/O handler program upon said terminal approaching a threshold point of being incapable of handling all of said requested characters.

6. The method of claim 5 wherein said requesting step comprises the steps of executing an operating system call to said I/O handler program.

7. The method of claim 6 wherein said determining step comprises the steps in said system call of
   verifying the number of characters to be transferred is greater than a predetermined number;
   executing another system call to enable said use of said set of characters as flow control characters; and
   transferring all of said characters to said terminal.

8. The method of claim 7 wherein said enabling step further comprises the step of checking an internal flag to determine if said flow control has been previously enabled; and
   setting said internal flag to enable upon said flow control being disabled.

9. The method of claim 5 further comprising the steps of:

disabling the use of said set of characters for flow control; and inputing other characters from said terminal to said computer system.

10. The method of claim 9 wherein said step of disabling comprises the step of performing a second system call to said operating system.

* * * * *